(12) United States Patent
Shankaramurthy et al.

(10) Patent No.: US 11,841,692 B2
(45) Date of Patent: *Dec. 12, 2023

(54) VARIABLE LOOP CONTROL FEATURE

(71) Applicant: Applied Materials, Inc., Santa Clara, CA (US)

(72) Inventors: Venkatanarayana Shankaramurthy, San Jose, CA (US); Anton Baryshnikov, Campbell, CA (US); Brett Berens, San Jose, CA (US); Mitesh Sanghvi, Sunnyvale, CA (US); Shuang Liu, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,936

(22) Filed: Sep. 16, 2022

(65) Prior Publication Data
US 2023/0014145 A1    Jan. 19, 2023

Related U.S. Application Data

(63) Continuation of application No. 17/326,984, filed on May 21, 2021, now Pat. No. 11,449,026.
(Continued)

(51) Int. Cl.
*G05B 19/18* (2006.01)
*B33Y 50/02* (2015.01)

(52) U.S. Cl.
CPC .......... *G05B 19/182* (2013.01); *B33Y 50/02* (2014.12); *G05B 2219/49013* (2013.01)

(58) Field of Classification Search
CPC ........ G05B 19/182; G05B 2219/49013; G05B 2219/45031; B33Y 50/02; H01L 21/02381
(Continued)

(56) References Cited

U.S. PATENT DOCUMENTS 6,025,596 A * 2/2000 Shirai ................ G01B 11/0625
250/339.11
2006/0081458 A1* 4/2006 Ford .................... H01J 37/3455
204/192.1
(Continued)

FOREIGN PATENT DOCUMENTS

CN     111351442 A  *  6/2020
CN     111351442 A     6/2020
(Continued)

OTHER PUBLICATIONS

International Search Report and Written Opinion for International Application PCT/US2021/034105, dated Sep. 14, 2021.

*Primary Examiner* — Thomas C Lee
*Assistant Examiner* — Michael Tang
(74) *Attorney, Agent, or Firm* — Lowenstein Sandler LLP

(57) ABSTRACT

A method includes identifying a recipe for depositing layers on a substrate in a processing chamber of a substrate processing system. The recipe comprises iterations of a set of one or more processes, and wherein each iteration of the iterations is for depositing at least one layer of the layers. The method further includes determining changes to parameters for depositing the at least one layer on the substrate. Each of the changes corresponds to a respective iteration of the iterations and is associated with a relative position of a corresponding layer. The layers are to be deposited on one or more substrates based on the recipe and the changes.

20 Claims, 6 Drawing Sheets

Related U.S. Application Data

(60) Provisional application No. 63/030,716, filed on May 27, 2020.

(58) Field of Classification Search
USPC .................................. 700/121, 119; 438/761
See application file for complete search history.

(56) References Cited

U.S. PATENT DOCUMENTS

| | | | |
|---|---|---|---|
| 2006/0224265 | A1 | 10/2006 | Nakayama et al. |
| 2006/0234402 | A1* | 10/2006 | Takizawa ................ H01L 22/20 |
| | | | 257/E21.525 |
| 2010/0003433 | A1* | 1/2010 | Ishii .................... B65D 75/305 |
| | | | 428/34.9 |
| 2010/0114553 | A1* | 5/2010 | Kim ........................ G06F 30/20 |
| | | | 700/104 |
| 2014/0170301 | A1* | 6/2014 | Jo ......................... C23C 14/545 |
| | | | 118/712 |
| 2015/0104575 | A1* | 4/2015 | Takoudis .............. C23C 16/406 |
| | | | 427/255.35 |
| 2016/0232215 | A1 | 8/2016 | Mochizuki |
| 2016/0322215 | A1* | 11/2016 | Shaikh .............. C23C 16/45587 |
| 2017/0314129 | A1 | 11/2017 | Karim et al. |
| 2020/0131619 | A1 | 4/2020 | Kalkhoran et al. |
| 2021/0066100 | A1* | 3/2021 | Liaw ................. H01L 21/67075 |

FOREIGN PATENT DOCUMENTS

| | | | |
|---|---|---|---|
| JP | 2008529276 | A | 7/2008 |
| WO | 2017184293 | A1 | 10/2017 |

\* cited by examiner

VARIABLE LOOP CONTROL FEATURE

RELATED APPLICATION

This application is a continuation of Non-Provisional patent application Ser. No. 17/326,984, filed May 21, 2021, which claims the benefit of Provisional Application No. 63/030,716, filed May 27, 2020, the entire contents are hereby incorporated by reference.

TECHNICAL FIELD

The present disclosure relates to a variable loop control feature, and, more particularly, a variable loop control feature for substrate processing.

BACKGROUND

Products are produced by performing one or more manufacturing processes using manufacturing equipment. For example, substrate processing equipment is used to produce substrates via substrate manufacturing processes. Substrate manufacturing processes include depositing layers on a substrate.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes identifying a recipe for depositing a plurality of layers on a substrate in a processing chamber of a substrate processing system. The recipe includes a plurality of iterations of a set of one or more processes. Each iteration of the plurality of iterations is for depositing at least one layer of the plurality of layers. The method further includes determining a plurality of iteration adjustments to cause uniformity of the plurality of layers. Each iteration adjustment of the plurality of iteration adjustments corresponds to a respective iteration of the plurality of iterations. The method further includes determining one or more multipliers to cause an adjustment in thickness of one or more layers of the plurality of layers. Each multiplier of the one or more multipliers corresponds to a corresponding iteration of the plurality of iterations. The method further includes storing the plurality of iteration adjustments and the one or more multipliers as a stored plurality of iteration adjustments and one or more stored multipliers. The plurality of layers are deposited on one or more substrates based on the recipe and the stored plurality of iteration adjustments and the one or more stored multipliers.

In another aspect of the disclosure, a non-transitory machine-readable storage medium storing instructions which, when executed cause a processing device to perform operations including identifying a recipe for depositing a plurality of layers on a substrate in a processing chamber of a substrate processing system. The recipe includes a plurality of iterations of a set of one or more processes. Each iteration of the plurality of iterations is for depositing at least one layer of the plurality of layers. The operations further include determining a plurality of iteration adjustments to cause uniformity of the plurality of layers. Each iteration adjustment of the plurality of iteration adjustments corresponds to a respective iteration of the plurality of iterations. The operations further include determining one or more multipliers to cause an adjustment in thickness of one or more layers of the plurality of layers. Each multiplier of the one or more multipliers corresponds to a corresponding iteration of the plurality of iterations. The operations further include storing the plurality of iteration adjustments and the one or more multipliers as a stored plurality of iteration adjustments and one or more stored multipliers. The plurality of layers are deposited on one or more substrates based on the recipe and the stored plurality of iteration adjustments and the one or more stored multipliers.

In another aspect of the disclosure, a system including memory and a processing device coupled to the memory. The processing device is to identify a recipe for depositing a plurality of layers on a substrate in a processing chamber. The recipe includes a plurality of iterations of a set of one or more processes. Each iteration of the plurality of iterations is for depositing at least one layer of the plurality of layers. The processing device is further to determine a plurality of iteration adjustments to cause uniformity of the plurality of layers. Each iteration adjustment of the plurality of iteration adjustments corresponds to a respective iteration of the plurality of iterations. The processing device is further to determine one or more multipliers to cause an adjustment in thickness of one or more layers of the plurality of layers. Each multiplier of the one or more multipliers corresponds to a corresponding iteration of the plurality of iterations. The processing device is further to store the plurality of iteration adjustments and the one or more multipliers as a stored plurality of iteration adjustments and one or more stored multipliers. The plurality of layers are deposited on one or more substrates based on the recipe and the stored plurality of iteration adjustments and the one or more stored multipliers.

BRIEF DESCRIPTION OF THE DRAWINGS

The present disclosure is illustrated by way of example, and not by way of limitation in the figures of the accompanying drawings.

DETAILED DESCRIPTION

Figure 1A:
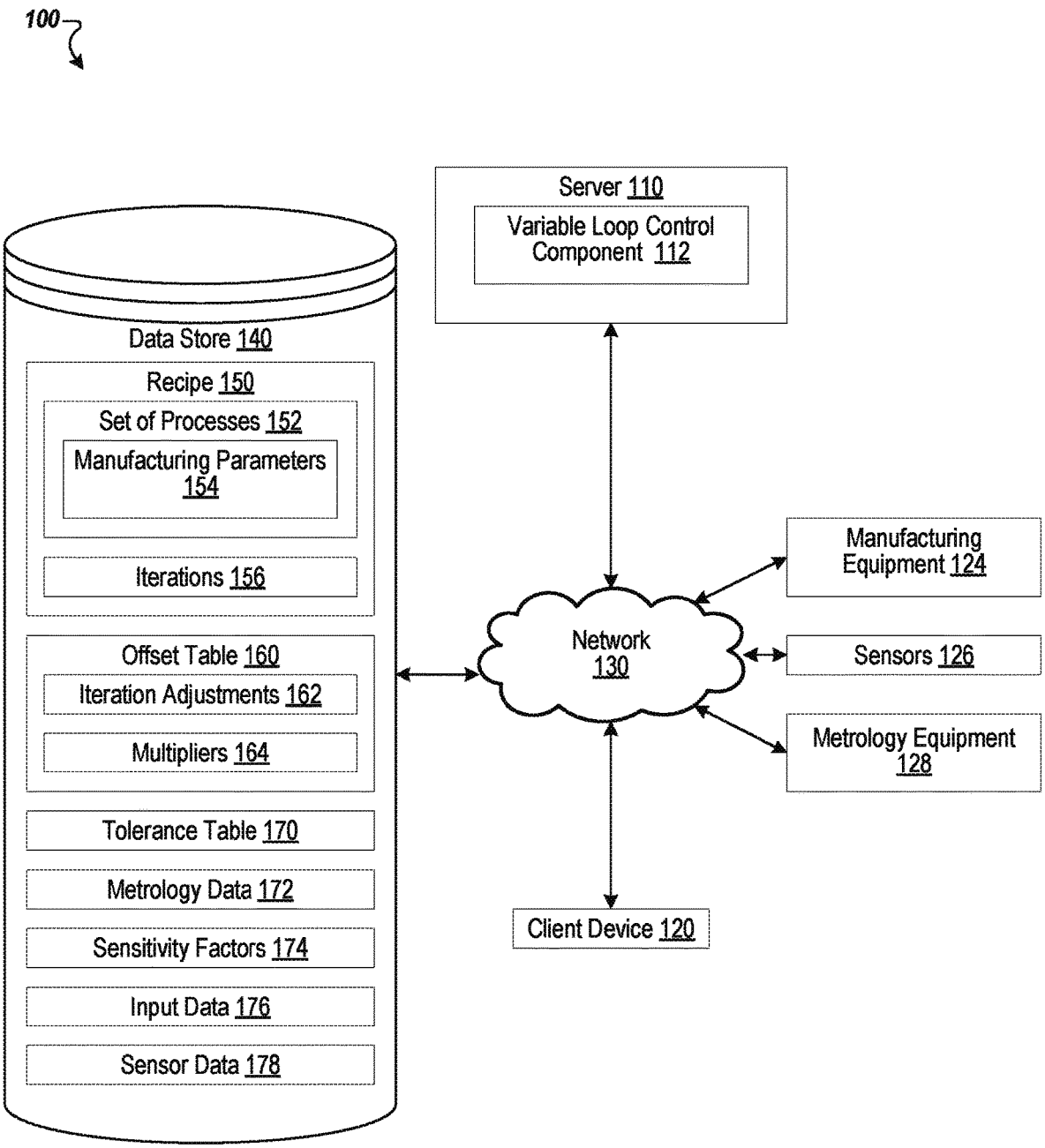
FIG. 1A is a block diagram illustrating an exemplary system architecture, according to certain embodiments.

Described herein are technologies directed to a variable loop control feature.

Products are produced by performing one or more manufacturing processes. For example, substrates (e.g., wafers, semiconductors, etc.) are produced by performing one or more substrate manufacturing processes. In some examples, processing chambers of a substrate processing system are used to deposit layers on a substrate. A recipe includes processes to produce a substrate. In some examples, a recipe includes loops (e.g., iterations) of the same set of processes. For example, a set of processes can be used to deposit a layer on a substrate and the same set of processes can be run in loops (e.g., repeated, multiple iterations) to deposit multiple layers on a substrate. As the layers are deposited on the substrate, properties of the layers change. For example, as layers are deposited on the substrate, the newest layers of the substrate are closer to the top of the chamber, the impedance properties in the chamber change, the way the heater makes contact with the newest layers is different, and the resulting thickness of the newest layers are different than that of other layers.

Conventionally, to maintain layers of the same thickness, different loops of a recipe are split into different recipes and the parameters of each loop is adjusted to be different from the other loops to maintain the uniform thickness. For example, if 50 layers of a substrate are each created by a separate loop of a recipe and each layer has a different thickness, the recipe is split into 50 different recipes and parameters of each of the 50 recipes are independently adjusted to maintain uniform thickness. Instead of repeating the same recipe multiple times, multiple separate recipes are executed. Execution of multiple separate recipes (e.g., instead of repeating the same recipe) increases energy consumption, processor overhead, and bandwidth used compared to executing one looped recipe. Execution of multiple separate recipes increases error, damage to substrates, and damage to the substrate processing system compared to executing one looped recipe. Creating, troubleshooting, maintaining, testing, and updating multiple separate recipes uses more computing time, personnel time, and resources compared to using one looped recipe.

The devices, systems, and methods disclosed herein provide a variable loop control feature to produce substrates using a recipe (e.g., looped recipe) and iteration adjustments and multipliers. A processing device identifies a recipe (e.g., looped recipe) for depositing layers on a substrate. The recipe has iterations (e.g., loops) of a set of processes that includes manufacturing parameters. Each iteration of the set of processes is for depositing one or more layers on the substrate.

The processing device determines iteration adjustments (e.g., corresponding to an iteration of the set of processes) to cause uniformity of the layers of the substrate. Each iteration adjustment updates one or more manufacturing parameters of the respective iteration of the set of processes by performing additive operations (e.g., addition of a value, subtraction of a value). Use of the iteration adjustments with the recipe would produce a substrate with uniform layers (e.g., layers of the same thickness, layers of the same interplanar spacing (distance), layers are uniform, etc.).

The processing device determines multipliers to cause an adjustment in thickness of layers of the substrate. In some embodiments, each multiplier updates at least one of the manufacturing parameters of a corresponding iteration of the set of processes by a multiplicative operation (e.g., multiply a value of a manufacturing parameter by 0.75, multiply a value of a manufacturing parameter by 1.2, etc.).

In some embodiments, an offset table is generated including the iteration adjustments and the multipliers (e.g., the processing device causes generation of the offset table, the processing device generates the offset table, etc.). The recipe and iteration adjustments and multipliers (e.g., in the offset table) are used to produce substrates.

Aspects of the present disclosure result in technological advantages. In some examples, a recipe of a set of processes (e.g., six processes) is for depositing an oxide and a nitride on a substrate and the set of processes is repeated (e.g., 50 times to create 100 layers on the substrate). In some examples, the set of processes is repeated in each chamber (e.g., seven chambers) of the substrate processing chambers. For six processes repeated 50 times in seven chambers, this equals 2,100 processes. Conventionally, the 2,100 processes are split into separate recipes (e.g., up to 2,100 recipes) that each have manufacturing parameters that are created, tested, maintained, etc. The present disclosure includes one recipe, iteration adjustments, and multipliers instead of the multiple separate recipes (e.g., up to 2,100 recipes). The use of one recipe with iteration adjustments and multipliers (e.g., an offset table) results in significant reduction in energy consumption, bandwidth used, processor overhead, and so forth, compared to the creation, testing, maintaining, and use of multiple different recipes. The present disclosure determines iteration adjustments and multipliers (e.g., causes generation of an offset table) to produce layers of specified thicknesses (e.g., uniform thicknesses, specified varying thicknesses, etc.). The present disclosure decreases damage to substrates, increases compliance of substrate layers with specified thicknesses, and decreases damage of the substrate processing system. The present disclosure decreases time of personnel, computing time, and resources compared to using multiple separate recipes.

FIG. 1A is a block diagram illustrating a system 100 (e.g., an exemplary system architecture), according to certain embodiments. The system 100 includes a client device 120, manufacturing equipment 124, sensors 126, metrology equipment 128, a server 110, and a data store 140.

The client device 120, manufacturing equipment 124, sensors 126, metrology equipment 128, and server 110 are coupled to each other via a network 130 for determining iteration adjustments 162 and multipliers 164 (e.g., causing generation of an offset table 160). In some embodiments, network 130 is a public network that provides client device 120 with access to the server 110, data store 140, and other publically available computing devices. In some embodiments, network 130 is a private network that provides client device 120 access to manufacturing equipment 124, sensors 126, metrology equipment 128, data store 140, and other privately available computing devices. Network 130 include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The server 110 includes one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc. In some embodiments, the server 110 includes a variable loop control component 112 that receives input (e.g., recipe 150, tolerance table 170, metrology data 172, input data 176, etc.) (e.g., from the data store 140, client device 120, metrology equipment 128, sensors 126, etc.), processes the input to generate output, and provides the output (e.g., offset table 160, iteration adjustments 162, multipliers 164, sensitivity factors 174, etc.) (e.g., to the data store 140, the client device 120, the manufacturing equipment 124, etc.). In some embodiments, the variable loop control component 112 is used to perform one or more operations of methods 200A-C of FIGS. 2A-C. In some embodiments, server 110 is a controller of a semiconductor processing system and is used to control the manufacturing equipment 124.

The client device 120 includes a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. In some embodiments, the client device 120 displays a Graphical User Interface (GUI) to receive input and to display output. In some embodiments, the client device 120 receives input (e.g., user input, recipe 150, tolerance table 170, metrology data 172, input data 176, etc.), transmits the input (e.g., to the variable loop control component 112, to the data store 140), receives output (e.g., offset table 160, iteration adjustments 162, multipliers 164, sensitivity factors 174, etc.), and displays the output.

In some embodiments, the manufacturing equipment 124 is part of a substrate processing system. The manufacturing equipment 124 includes one or more of an enclosure system (e.g., substrate carrier, front opening unified pod (FOUP), autoteach FOUP, process kit enclosure system, substrate enclosure system, etc.), a side storage pod (SSP), an aligner device, a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber.

The manufacturing equipment 124 includes one or more processing chambers to produce substrates based on a recipe 150 iteration adjustments 162, and multipliers 164 (e.g., an offset table 160). The recipe 150 includes a set of processes 152 (e.g., that include manufacturing parameters 154) repeated over a number of iterations 156 to deposit layers on a substrate. The iteration adjustments 162 (e.g., additive operations to cause the substrate to have uniform layers) and multipliers 164 (e.g., multiplicative operations to selectively change the thickness of layers of the substrate based on input data 176) are stored (e.g., in an offset table 160).

The sensors 126 provide sensor data 178 (e.g., sensor values, trace data) associated with manufacturing equipment 124 (e.g., associated with producing, by manufacturing equipment 124, substrates). In some embodiments, the sensor data 178 is used to determine actual manufacturing parameters 154 of the manufacturing equipment 124. In some embodiments, the sensor data 178 is used for equipment health and/or product health (e.g., substrate quality). The manufacturing equipment 124 produce substrates following a recipe 150 (e.g., performing runs, performing loops, performing iterations 156, repeating the set of processes 152, etc.), iteration adjustments 162, and multipliers 164 (e.g., offset table 160) over a period of time. Sensor data 178 (e.g., trace data) is received from different sensors 126 over a period of time (e.g., corresponding to at least part of a recipe 150 or run).

In some embodiments, the sensor data 178 include values of one or more of temperature (e.g., heater temperature), spacing (SP), pressure, High Frequency Radio Frequency (HFRF), Low Frequency Radio Frequency (LFRF), Radio Frequency (RF) power, voltage of Electrostatic Chuck (ESC), electrical current, flow, power, voltage, etc. In some embodiments, sensor data 178 is associated with or indicative of manufacturing parameters 154 such as hardware parameters (e.g., settings or components (e.g., size, type, etc.) of the manufacturing equipment 124) or process parameters of the manufacturing equipment. The sensor data 178 is provided while the manufacturing equipment 124 is performing manufacturing processes (e.g., equipment readings when processing products). In some embodiments, the sensor data 178 is different for each substrate and/or layer.

The metrology equipment 128 is used to determine metrology data 172 corresponding to products of the manufacturing equipment 124. In some embodiments, after the manufacturing equipment 124 deposits one or more layers on a substrate, the metrology equipment 128 is used to determine one or more thicknesses of the layers, uniformity of the layers, interlayer spacing of the layer, or the like. In some embodiments, the metrology equipment 128 includes an imaging device.

Data store 140 is a memory (e.g., random access memory), a drive (e.g., a hard drive, a flash drive), a database system, or another type of component or device capable of storing data. Data store 140 includes multiple storage components (e.g., multiple drives or multiple databases) that span multiple computing devices (e.g., multiple server computers). The data store 140 stores one or more of recipe 150, offset table 160, iteration adjustments 162, multipliers 164, tolerance table 170, metrology data 172, sensitivity factors 174, input data 176, and/or sensor data 178.

Recipe 150 includes a set of processes 152 that includes manufacturing parameters 154. Recipe 150 further includes iterations 156 (e.g., loops, repetitions of the set of processes 152). Manufacturing parameters 154 include hardware parameters (e.g., using certain components, firmware executed by the components, software executed by the components, etc.) and/or process parameters (e.g., temperature, pressure, flow, rate, electrical current, voltage, gas flow, lift speed, etc.). Recipe 150 is further described in relation to FIG. 1B.

The iteration adjustments 162 (e.g., additive operations associated with manufacturing parameters 154 to cause the layers to be uniform) and multipliers 164 (e.g., multiplicative operations associated with the manufacturing parameters 154 to cause the layers to have specific thicknesses) are stored (e.g., in an offset table 160). Offset table 160, iteration adjustments 162, and multipliers 164 are further described in relation to FIG. 1C.

Tolerance table 170 includes one or more of a default value, a minimum value, and/or a maximum value for each manufacturing parameter 154. Tolerance table 170 is further described in relation to FIG. 1D.

Metrology data 172 includes image data, thickness values, interlayer spacing values, uniformity values, performance data, whether layers of a substrate meet threshold values, an indication of variance in the layers of the substrate, property data of substrates, yield, substrate spatial film properties, dimensions (e.g., thickness, height, etc.), dielectric constant, dopant concentration, density, defects (e.g., whether a substrate and/or layer meets a threshold property, why the substrate and/or layer does not meet a threshold property), and/or the like. In some embodiments, the metrology data 172 is for finished or semi-finished substrates. In some embodiments, the metrology data 172 is different for each substrate and/or layer.

Sensitivity factors 174 include an indication amounts of adjustment of manufacturing parameters 154 to cause an amount of change in thickness of a layer of a substrate.

Input data 176 includes user input received from the client device 120 (e.g., recipe 150, tolerance table, particular thicknesses of layers, etc.). In some examples, the input data 176 indicates greater thickness for one or more bottom layers and lesser thickness for one or more upper layers.

For purpose of illustration, rather than limitation, aspects of the disclosure describe determining iteration adjustments 162 and multipliers 164 to cause depositing of layers on substrates. In some implementations, a heuristic model or rule-based model is used to determine iteration adjustments 162 and multipliers 164 (e.g., cause generation of offset table 160). Variable loop control component 112 monitors metrology data 172 to determine iteration adjustments 162 and multipliers 164 (e.g., cause generation of an offset table 160) for recipe 150. In some embodiments, a trained machine learning model is used to determine iteration adjustments 162 and multipliers 164 (e.g., determine an offset table 160). Historic recipes and historic metrology data are used as data input and historical iteration adjustments and historical multipliers (e.g., historical offset tables) (e.g., of uniform layers, of layers of specific thicknesses) are used as target output to train a machine learning model. Recipe 150 and metrology data 172 are used as input into the trained machine learning model and iteration adjustments 162 and multipliers 164 (e.g., offset table 160) is determined from the output of the trained machine learning model.

In some embodiments, the functions of client device 120 and server 110 are provided by a fewer number of machines. In some embodiments, client device 120 and server 110 are integrated into a single machine.

In some embodiments, one or more functions described as being performed by client device 120 can also be performed on server 110, if appropriate. In addition, the functionality attributed to a particular component can be performed by different or multiple components operating together. For example, in some embodiments, the server 110 determines iteration adjustments 162 and multipliers 164 (e.g., causes generation of the offset table 160) and in some embodiments, the client device determines iteration adjustments 162 and multipliers 164 (e.g., causes generation of the offset table 160).

In addition, the functions of a particular component can be performed by different or multiple components operating together. In some embodiments, the server 110 is accessed as a service provided to other systems or devices through appropriate application programming interfaces (API).

In embodiments, a "user" is represented as a single individual. However, other embodiments of the disclosure encompass a "user" being an entity controlled by a plurality of users and/or an automated source. For example, a set of individual users federated as a group of administrators is considered a "user."

Although portions of the present disclosure refer to depositing layers of specific thicknesses on a substrate via substrate processing in a substrate chamber of a substrate processing system, in some embodiments, the present disclosure is generally applied to other repetitive processes.

Figures 1B, 1C, 1D:
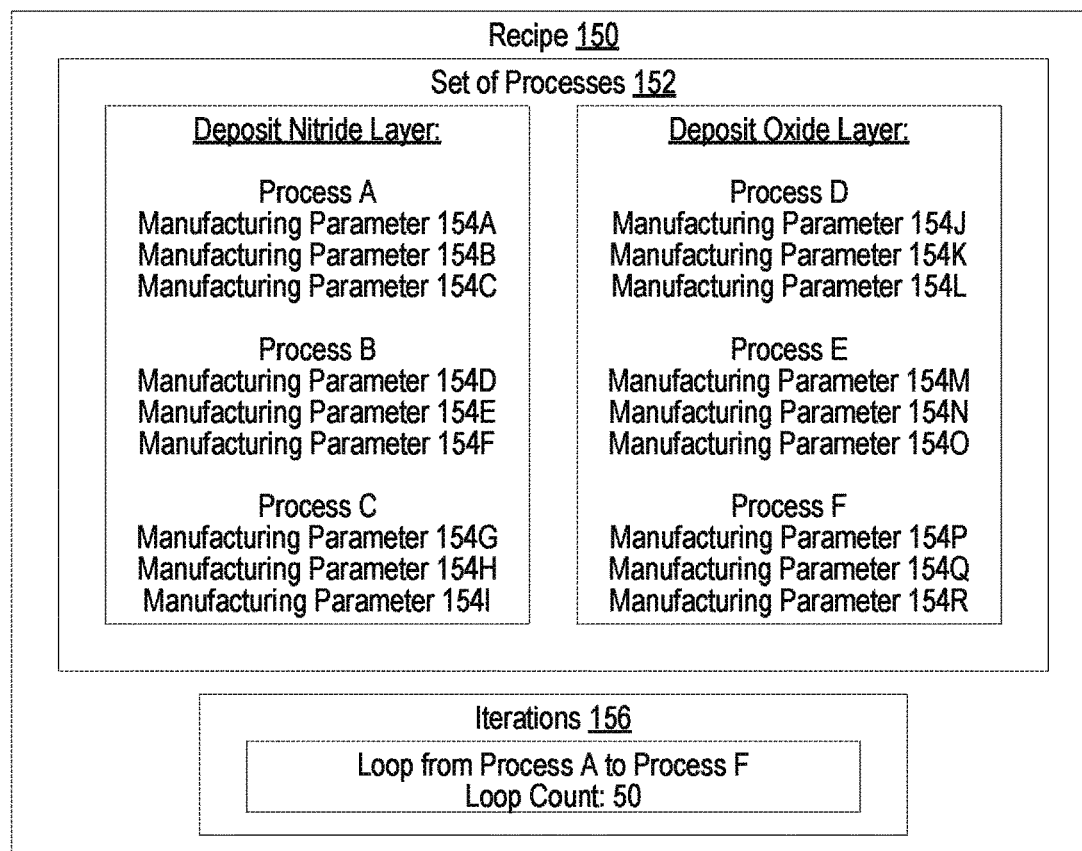
FIG. 1B is a recipe for use with iteration adjustments and multipliers, according to certain embodiments.
FIG. 1C is an offset table including iteration adjustments and multipliers, according to certain embodiments.
FIG. 1D is a tolerance table for use with iteration adjustments and multipliers, according to certain embodiments.

FIG. 1B is a recipe 150 for use with iteration adjustments and multipliers, (e.g., offset table 160, iteration adjustments 162, and/or multipliers 164 of FIGS. 1A and 1C), according to certain embodiments. In some embodiments, the recipe 150 includes a set of processes 152 that are repeated for a number of iterations 156 (e.g., loops). In some examples, the set of processes 152 includes a set of processes 152 including processes A-F, where processes A-C are used to deposit a layer of a first type (e.g., nitride) on the substrate and processes D-F are used to deposit a layer of a second type (e.g., oxide) on the substrate. Each process of the set of processes 152 includes manufacturing parameters 154. For example, Process A includes manufacturing parameters 154A-B.

The iterations 156 indicates specific processes and a number of repetitions. In some examples, the iterations indicate loop from process A to process F (e.g., perform each of processes A-F, perform set of processes 152) for a loop count (e.g., number of iterations) of 50.

FIG. 1C is an offset table 160, according to certain embodiments. The offset table 160 indicates manufacturing parameters 154 (e.g., corresponding to a process, corresponding to a set of processes 152), iteration adjustments 162, and multipliers 164.

The iteration adjustments 162 indicate an additive operation (e.g., addition, subtraction) for a manufacturing parameter 154 (e.g., corresponding to a process of a set of processes 152) for each of the iterations 156. In some examples, for process A of the set of processes 152, manufacturing parameter 154A is increased by 0 in a first iteration, increased by 0 in a second iteration, is increased by 10 in a third iteration, is increased by 10 in a fourth iteration, and is increased by 10 in a fifth iteration. In some examples, for process B of the set of processes 152, manufacturing parameter 154B is increased by 0 in a first iteration, increased by 5 in a second iteration, is increased by 10 in a third iteration, is increased by 15 in a fourth iteration, and is increased by 20 in a fifth iteration. In some examples, for process C of the set of processes 152, manufacturing parameter 154C is decreased by 5 (e.g., increased by −5) in a first iteration, decreased by 5 in a second iteration, increased by 0 in a third iteration, increased by 0 in a fourth iteration, and increased by 5 in a fifth iteration. The iteration adjustments 162 are used to cause the layers of the substrate to be uniform (e.g., same thickness, same interlayer spacing, etc.).

The multipliers 164 indicate a multiplicative operation for a manufacturing parameter 154 (e.g., corresponding to a process of a set of processes) for each of the iterations 156. In some embodiments, the multipliers 164 are applied to the manufacturing parameters 154 after the iteration adjustments 162 are applied to the manufacturing parameters 154. In some examples, for process A of the set of processes 152, manufacturing parameter 154A is multiplied by 2 in a first iteration, is multiplied by 1 in a second iteration, is multiplied by 1 in a third iteration, and is multiplied by 0.4 in a fourth iteration. In some examples, for process B of the set of processes 152, manufacturing parameter 154B is multiplied by 1 in each of the iterations 156 (e.g., manufacturing parameter 154B is not varied to change the thickness of layers produced by the first, second, third, and fourth iterations). In some examples, for process C of the set of processes 152, manufacturing parameter 154C is multiplied by 1.5 in a first iteration, is multiplied by 1 in a second iteration, is multiplied by 1 in a third iteration, and is multiplied by 1 in a fourth iteration. The multipliers 164 are used to cause specific layers of the substrate to have specific thicknesses. The specific thickness may be part of input data 176 received via the client device 120.

FIG. 1D is a tolerance table 170 for use with iteration adjustments and multipliers (e.g., offset table 160, iteration adjustments 162, and/or multipliers 164 of FIGS. 1A and 1C), according to certain embodiments. In some embodiments, the tolerance table 170 is indicative of one or more of a default value (e.g., "Default"), a minimum value (e.g., "Min"), and/or a maximum value (e.g., "Max") of a manufacturing parameter 154. In some examples, manufacturing parameter 154A has a default value of 10, a minimum value of 0, and a maximum value of 100. In some examples, manufacturing parameter 154B has a default value of 50, a minimum value of 0, and a maximum value of 100. In some examples, manufacturing parameter 154C has a default value of 20, a minimum value of 0, and a maximum value of 50.

In some embodiments, the variable loop control component 112 adds an iteration adjustment 162 to a manufacturing parameter 154 to generate a sum and multiplies the sum by a multiplier 164 to generate a product. The product is compared to the tolerance table 170. Responsive to the product not being below the minimum value and not being above the maximum value, the product is used. Responsive to the product being below the minimum value, the minimum value is used. Responsive to the product being above the maximum value, the maximum value is used. In some embodiments, responsive to the product being below the minimum value or above the maximum value, a corrective action is performed (e.g., an alert is sent to the client device 120, the execution of the recipe 150 is stopped, the manufacturing equipment 124 is interrupted, etc.).

Figure 2A:
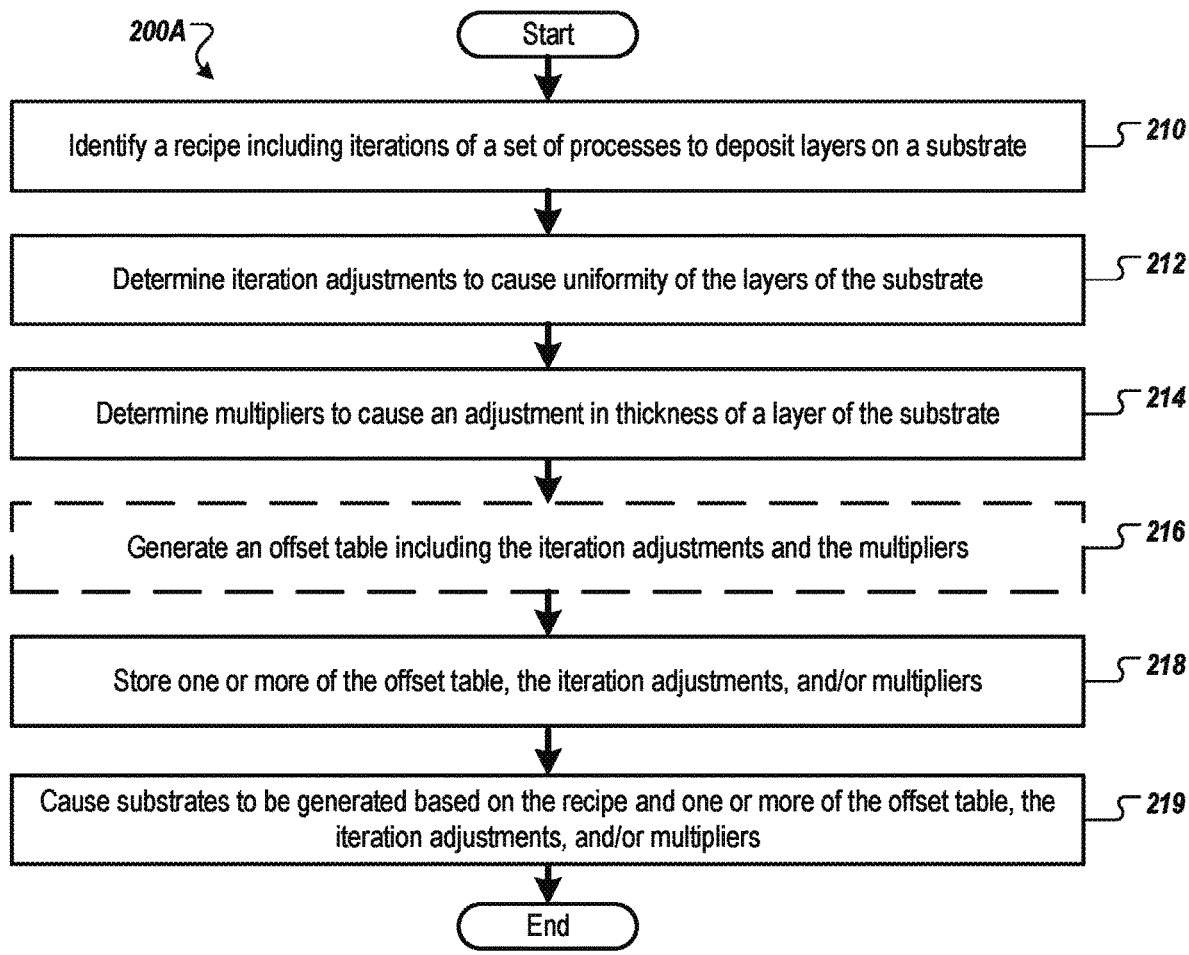
FIGS. 2A-C are flow diagrams of methods associated with using iteration adjustments and multipliers to produce substrates, according to certain embodiments.
Figure 2B:
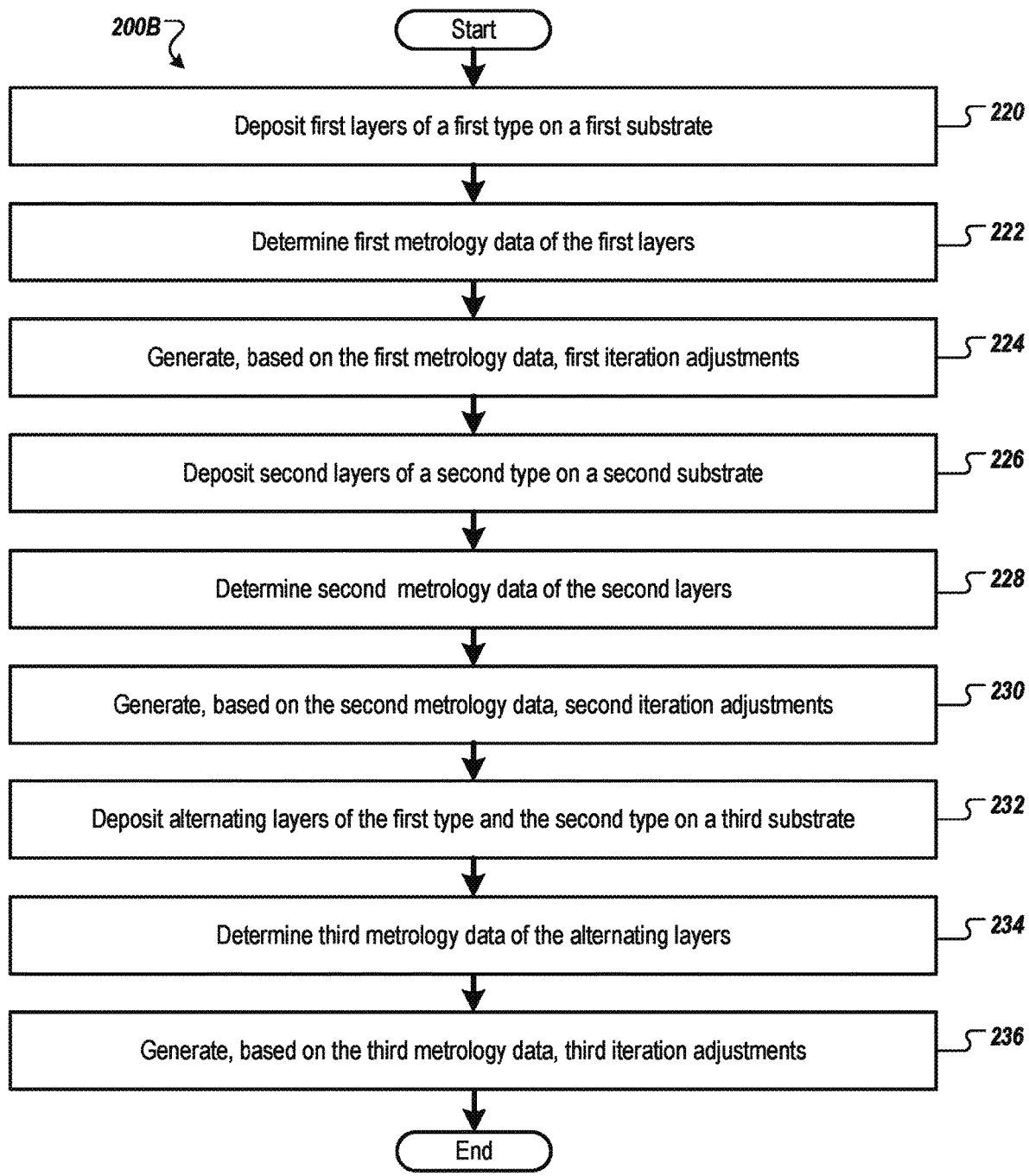
Figure 2C:
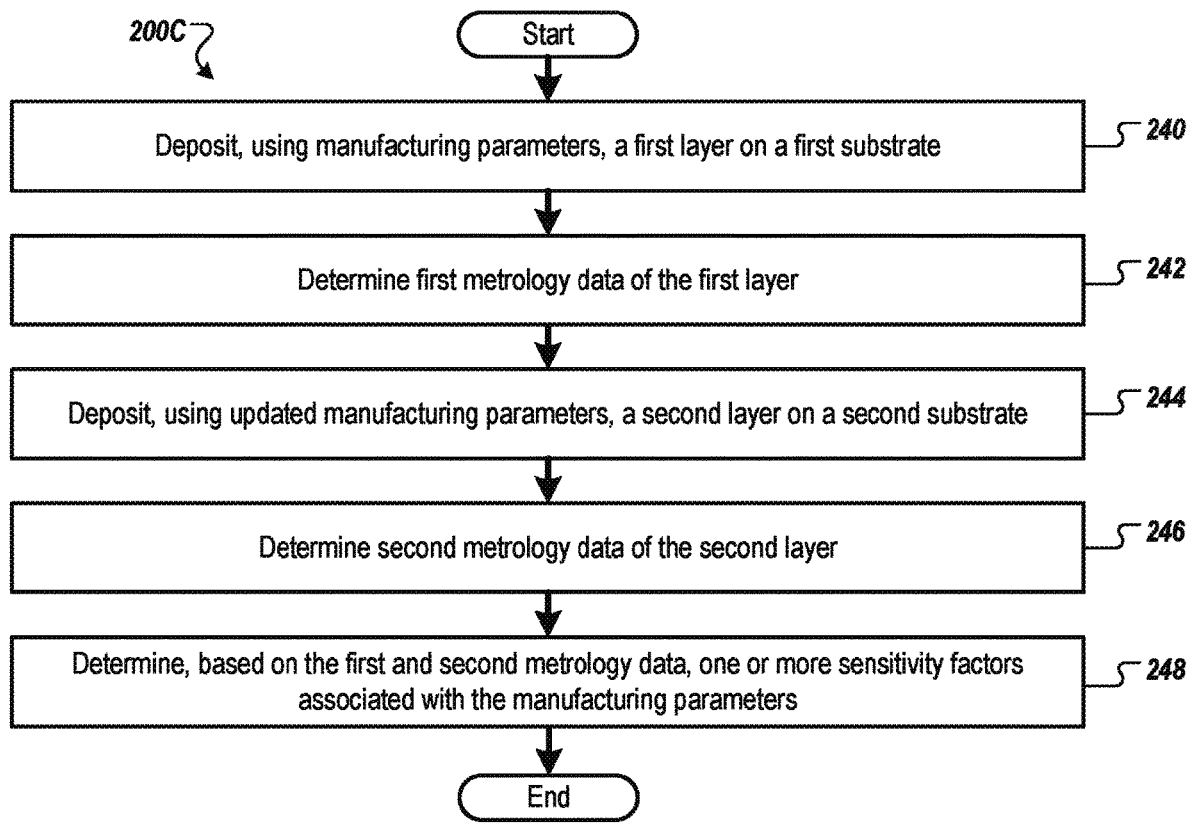

FIGS. 2A-C are flow diagrams of methods 200A-C associated with using iteration adjustments and multipliers (e.g., offset table 160, iteration adjustments 162, and/or multipliers 164 of FIGS. 1A and/or 1C) to produce substrates, according to certain embodiments. Methods 200A-C are performed by processing logic that include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 200A-C are performed, in part, by server 110 (e.g., variable loop control component 112). In some embodiments, a non-transitory storage medium stores instructions that when executed by a processing device (e.g., of server 110, etc.) cause the processing device to perform one or more of methods 200A-C.

For simplicity of explanation, methods 200A-C are depicted and described as a series of operations. However, operations in accordance with this disclosure can occur in various orders and/or concurrently and with other operations not presented and described herein. Furthermore, in some embodiments, not all illustrated operations are be performed to implement methods 200A-C in accordance with the disclosed subject matter. In addition, those skilled in the art will understand and appreciate that methods 200A-C could alternatively be represented as a series of interrelated states via a state diagram or events.

Referring to FIG. 2A, at block 210 of method 200A, processing logic identifies a recipe including iterations (e.g., loops) of a set of processes to deposit layers on a substrate (e.g., in a processing chamber of a substrate processing system). Each iteration is for depositing at least one layer of the layers on the substrate. The set of processes includes manufacturing parameters (e.g., gas flow rate, HFRF power, LFRF power, lift spacing (distance), chamber pressure, bottom tuner parameters, inner zone heater temperature, etc.) for depositing the at least one layer on the substrate.

In some embodiments, the processing logic receives the recipe as input data from a client device. In some embodiments, the processing logic receives the recipe from a data store.

In some embodiments, the recipe has iterations (e.g., loop information) to loop from a first operation to a second operation for a loop count. In some embodiments, the recipe has iterations (e.g., loop information) to loop to a particular operation for a loop count.

At block 212, processing logic determines iteration adjustments to cause uniformity (e.g., each layer has the same thickness, each layer is uniform, each set of adjacent layers has the same interplanar spacing, etc.) of the layers of the substrate. Each iteration adjustment corresponds to a respective iteration of the set of processes. Each iteration adjustment updates one or more of the manufacturing parameters of the respective iteration by performing one or more additive operations (e.g., add a value, add a negative value, add zero, etc.).

In some embodiments, block 212 includes one or more operations of method 200B of FIG. 2B.

At block 214, processing logic determines multipliers to cause an adjustment in thickness of a layer of the substrate. Each multiplier corresponds to a corresponding iteration. Each multiplier updates at least one manufacturing parameter of the corresponding iteration by performing one or more corresponding multiplicative operations (e.g., multiply by 1, multiply by a positive number less than one, multiply by a number greater than one, etc.).

In some embodiments, the multipliers of block 214 are generated based on the sensitivity factors determined by one or more operations of method 200C of FIG. 2C.

In some embodiments, the adjustment in thickness of a layer of the substrate is received as input data from a client device and/or from a data store. In some examples, input data (e.g., user input) indicates one or more particular lower layers are to be thicker and one or more particular upper layers are to be thinner.

In some embodiments, the multipliers are determined based on the adjustment in thickness of a layer and the sensitivity factors. In some embodiments, different manufacturing parameters are adjusted based on input data. In some examples, power is increased instead of time responsive to input data indicating that throughput is a priority. In some examples, time is increased instead of power responsive to input data indicating that energy reduction is a priority.

In some embodiments, at block 216, processing logic causes generation of an offset table including the iteration adjustments and the multipliers. In some embodiments, the offset table is generated based on feedback of metrology. In some embodiments, at block 216, the processing logic generates the offset table. In some examples, the generating of the offset table is performed automatically (e.g., by software). In some embodiments, at block 216, to cause generation of the offset table, the processing logic provides the iteration adjustments and multiplier (e.g., via a GUI, via a database, etc.) to one or more users and the generation of the offset table is performed manually. In some embodiments, the offset table, iteration adjustments, and/or the multipliers are referred to as a variable loop adjustment feature. In some embodiments, the offset table includes iteration adjustments and multipliers for each manufacturing parameter of the set of processes for each iteration. In some embodiments, the offset table includes iteration adjustments and multipliers for a subset of the manufacturing parameters of the set of processes for at least some of the iteration. In some embodiments, the offset table includes iteration adjustments and multipliers for at least some of the manufacturing parameters of the set of processes for a subset of the iterations.

In some embodiments, manufacturing parameters are adjusted and/or tuned per chamber in a given recipe using the iteration adjustments and/or multipliers (e.g., the offset table). The manufacturing parameters include one or more of gas flow rates (e.g., up to ten gases, flow to chamber, flow to divert), slot independent HFRF power, slot independent LFRF power, slot independent lift spacing (e.g., lift position of move to process), slot independent chamber pressure, slot independent bottom tuner first pressure, slot independent bottom tuner second pressure, slot independent bottom tuner expected second pressure, slot independent inner zone heater temperature, and/or the like. In some embodiments, the offset values for the different manufacturing parameters are stored in the same offset table.

At block 218, processing logic stores one or more of the offset table, the iteration adjustments, and/or multipliers (e.g., in a data store, in a database, in an offset table, etc.).

At block 219, processing logic causes substrates to be generated based on the recipe and one or more of the iteration adjustments, multipliers, and/or the offset table. In some examples, processing logic causes layers to be deposited on one or more substrates based on the recipe and one or more of the offset table, the iteration adjustments, and/or the multipliers (e.g., causes the stored offset table, the stored iteration adjustments, and/or the stored multipliers to be retrieved and used to cause layers to be deposited on one or more substrates). In some embodiments, responsive to a variable loop adjustment feature being enabled, the offset table, iteration adjustments, and/or multipliers are used in conjunction with the recipe to adjust manufacturing parameters in loop. In some embodiments, the processing logic causes a value of a manufacturing parameter to be added to a value of an iteration adjustment to generate a sum (e.g., an updated manufacturing parameter that would generate a uniform layer) and the sum is multiplied by a multiplier to generate a product (e.g., an updated manufacturing parameter to generate a layer of a specified thickness). The equation is as follows: Final Value=(Raw Setpoint+Offset) *Multiplier. The final value is the updated manufacturing parameter. The raw setpoint is the original manufacturing parameter specified in the recipe. The offset is the iteration adjustment.

In some embodiments, the offset table, iteration adjustments, and/or multipliers are used to tune manufacturing parameters (e.g., gas flow, RF power, lift spacing, pressure, heater temperature, etc.) of the recipe (e.g., a looped recipe) during run-time. As a recipe is run in loops for depositing layers on a substrate, the thickness of the substrate keeps increasing and the offset of values of manufacturing parameters results in identical deposition layers and/or specified thickness of layers.

In some embodiments, the offset table, iteration adjustments, and/or multipliers are a recipe template that is used to modulate one or more gas sticks (e.g., gas supply control device including shutoff valve, pressure control regulator, and/or gauge) and/or one or more manufacturing parameters, such as gas flow rates, power, spacing, pressure, temperature, etc. In some embodiments, the recipe is an existing recipe template which is used to do processing of substrates. One new parameter is added to the recipe which will enable using of the offset table, iteration adjustments, and/or multipliers in a given recipe operation. Once both the recipes are created (e.g., the offset table and the recipe with a new parameter to enable using the offset table), the processing logic, for execution of each recipe operation, determines whether an offset table is associated with the recipe operation. If an offset table is associated with the recipe operation, the processing logic opens the offset table, reads the values (e.g., iteration adjustments, multipliers), and stores the values in arrays and lists. The processing logic takes the default setpoint (e.g., default manufacturing parameters) from the recipe operation, adds the offsets (e.g., iteration adjustments) from the arrays (e.g., and multiplies the resulting sums by the corresponding multipliers) and stores the resulting values (e.g., back into vectors). In some embodiments, vectors are used to save memory space since different recipes used different numbers of loops. In some embodiments, rather than storing actual setpoints in the recipe file, a reference attribute name is stored and the value of the reference attribute name is checked during run-time. At run-time, the value of the reference attribute is updated from the vector looking at the information such as recipe operation number, loop number, gas stick number (e.g., gas supply control device number), and/or the like.

In some embodiments, the substrates are generated based on the recipe and the offset table, iteration adjustments, and/or multipliers without splitting up the iterations (e.g., loops) of the recipe (e.g., without splitting the recipe into separate recipes, by executing the recipe as a set of processes that has a number of iterations).

In some embodiments, the product is compared to a minimum value and/or a maximum value specified by a tolerance table. In some examples, the tolerance table indicates that the calculated setpoint for lift spacing should be greater than 100 mil, less than a maximum safe spacing, and, responsive to RF being on, greater than a minimum safe spacing with RF. Responsive to the product being greater than a maximum value, the maximum value is used. Responsive to the product being less than a minimum value, the minimum value is used. In some embodiments, responsive to the product being greater than the maximum value or less than the minimum value, a corrective action is performed (e.g., an alert is sent to the client device). In some embodiments, responsive to the product not being greater than the maximum value and not being less than the minimum value, the product is used. In some embodiments, the calculated setpoint for manufacturing parameters (e.g., gas flow, HFRF power, LFRF power, etc.) is to be positive.

In some embodiments, for a given chamber, there can be more than one offset table, set of iteration adjustments, and/or set of multipliers (e.g., one per recipe operation), but the gases selected cannot be more than a threshold value (e.g., six, ten). In some embodiments, selecting duplicate gas sticks (e.g., duplicate gas supply control devices) in the same offset table, iteration adjustments, and/or multipliers is not allowed. In some embodiments, using nested loops with an offset table, iteration adjustments, and/or multipliers is not allowed. In some embodiments, lift position as same as before/after, HFRF before/after mode, and LFRF before/after mode cannot be used in the recipe operation that has an offset table, iteration adjustments, and/or multipliers. In some embodiments, same-as-after mode cannot be selected in a recipe operation preceding a recipe operation that is adjusted by an offset table, iteration adjustments, and/or multipliers. In some embodiments, same-as-before mode cannot be selected in a recipe operation following a recipe operation that is adjusted by an offset table, iteration adjustments, and/or multipliers. In some embodiments, the LFRF loop adjustment cannot be used in a first step of a loop.

Referring to FIG. 2B, at block 220 of method 200B, processing logic deposits first layers of a first type on a first substrate. In some examples, the processing logic executes first processes (that include manufacturing parameters) to cause five layers of oxide to be deposited on a first substrate.

At block 222, processing logic determines first metrology data (e.g., variations layer to layer) of the first layers. In some examples, the processing logic determines the thickness of each layer of the five layers of oxide.

At block 224, processing logic generates, based on the first metrology data, first iteration adjustments. In some embodiments, the first iteration adjustments are updates to manufacturing parameters of the first processes used to cause the five layers of oxide to be deposited on the first substrate.

In some embodiments, blocks 220-224 are repeated for layers of different types. For example, blocks 226-230 are for layers of a second type that is different from the first type.

At block 226, processing logic deposits second layers of a second type on a second substrate. In some examples, the processing logic executes second processes (that include manufacturing parameters) to cause five layers of nitride to be deposited on a second substrate (different from the first substrate where the five layers of oxide were deposited).

At block 228, processing logic determines second metrology data of the second layers. In some examples, the processing logic determines the thickness of each layer of the five layers of nitride.

At block 230, processing logic generates, based on the second metrology data, second iteration adjustments. In some embodiments, the second iteration adjustments are updates to manufacturing parameters of the second processes used to cause the five layers of nitride to be deposited on the second substrate.

At block 232, processing logic deposits alternating layers of the first type and the second type on a third substrate (e.g., a layer of the first type followed by a layer of the second type, etc.). In some embodiments, processing logic executes the first and second processes (that include manufacturing parameters) to cause alternating five layers of oxide and five layers of nitride to be deposited on a third substrate (e.g., first layer of oxide deposited on substrate, first layer of nitride deposited on the first layer of oxide, second layer of oxide deposited on the first layer of nitride, etc.). In some embodiments, the processing logic executes the first and second processes based on the first iteration adjustments and the second iteration adjustments. In some embodiments, the processing logic determines iteration adjustments and/or causes generation of an offset table based on the first and second iteration adjustments (e.g., from blocks 224 and 230) and the processing logic executes the first and second processes based on the offset table and/or iteration adjustments.

At block 234, processing logic determines third metrology data of the alternating layers. In some embodiments, the processing logic determines the thickness of each layer of the five layers of oxide and the five layers of nitride.

At block 236, processing logic generates, based on the third metrology data, third iteration adjustments. In some embodiments, the first and second iteration adjustments of blocks 224 and 230 adjust one or more manufacturing parameters and the third iteration adjustments of block 236 adjust the manufacturing parameter of time (e.g., time value).

In some embodiments, the iteration adjustments of block 212 of FIG. 2A and/or offset table of block 216 of FIG. 2A are generated based on one or more of the first iteration adjustments of block 224, the second iteration adjustments of block 230, and/or the third iteration adjustments of block 236. In some embodiments, the iteration adjustments determined by blocks 224, 230, and/or 236 are extrapolated out to cause generation of the iteration adjustments of block 212 of FIG. 2A and/or offset table of block 216 of FIG. 2A (e.g., the iteration adjustments for five layers and/or the iteration adjustments for ten layers are extrapolated out to 50 layers). In some embodiments, the iteration adjustments and/or offset table generated based on one or more iteration adjustments of method 200B is applied to different types of layers, substrates, and/or processing chambers than those used in method 200B.

In some embodiments, the processing logic repeats one or more of blocks 220-236 with applying the iteration adjustments during depositing of the layers to generate updated iteration adjustments (e.g., to validate and/or test the iteration adjustments). In some embodiments, the processing logic repeats one or more of blocks 220-236 with applying the iteration adjustments during depositing greater amounts of layers than those deposited in blocks 220-236 to generate updated iteration adjustments (e.g., the extrapolated iteration adjustments are used for depositing 10 layers instead of 5 layers).

In some embodiments, the processing logic repeats one or more of blocks 220-236 with applying the iteration adjustments and multipliers during depositing of the layers to generate updated multipliers (e.g., to validate and/or test the multipliers). In some embodiments, the processing logic repeats one or more of blocks 220-236 with applying the iteration adjustments and/or multipliers during depositing of the layers in a different processing chamber than that used to determine the iteration adjustments and/or multipliers to generate updated iteration adjustments and/or multipliers (e.g., to validate and/or test the iteration adjustments and/or multipliers for a different processing chamber).

Referring to FIG. 2C, at block 240 of method 200C, processing logic deposits, using manufacturing parameters, a first layer on a first substrate. In some examples, the manufacturing parameters are the default manufacturing parameters of a recipe.

At block 242, processing logic determines first metrology data (e.g., thickness, interplanar distance, uniformity, etc.) of the first layer.

At block 244, processing logic deposits, using updated manufacturing parameters, a second layer on a second substrate. In some examples, the updated manufacturing parameters include one or more of power (e.g., RF power), impedance of plasma (e.g., bottom tuner), and/or time that are adjusted compared to the default manufacturing parameters of the recipe.

At block 246, processing logic determines second metrology data (e.g., thickness, interplanar distance, uniformity, etc.) of the second layer.

At block 248, the processing logic determines, based on the first and second metrology data, one or more sensitivity factors associated with the manufacturing parameters. The sensitivity factors indicate a relationship between updating a manufacturing parameter (e.g., multiplying a value of a manufacturing parameter by a multiplier) and the resulting change in thickness (e.g., multiplier of thickness of the layer). In some examples, a sensitivity factor indicates a multiplier of one manufacturing parameter is associated with a multiplier of the thickness of the layer (e.g., doubling the impedance of the plasma causes triple the thickness of the layer). In some examples, sensitivity factors indicate that different multipliers of different manufacturing parameters used together is associated with a multiplier of the thickness of the layer (e.g., doubling the impedance of the plasma and halfing the time cause double the thickness of the layer).

One or more of blocks 242-248 are repeated with different manufacturing parameters to determine the sensitivity factors. In some embodiments, only one manufacturing parameter is changed at a time to determine the effects of updates to single manufacturing parameter. In some embodiments, multiple manufacturing parameters are changed at a time to determine the effects of updates to multiple manufacturing parameters. In some embodiments, blocks 242-248 are repeated with different numbers of layers, different types of layers, alternating stacks of layers, different processing chambers, and/or the like.

In some embodiments, the experiments of method 200C (e.g., sensitivity experiments) are different than those of method 200B (e.g., uniformity experiments).

In some embodiments, the multipliers of block 214 of FIG. 2A are determined based on sensitivity factors of block 248.

Figure 3:
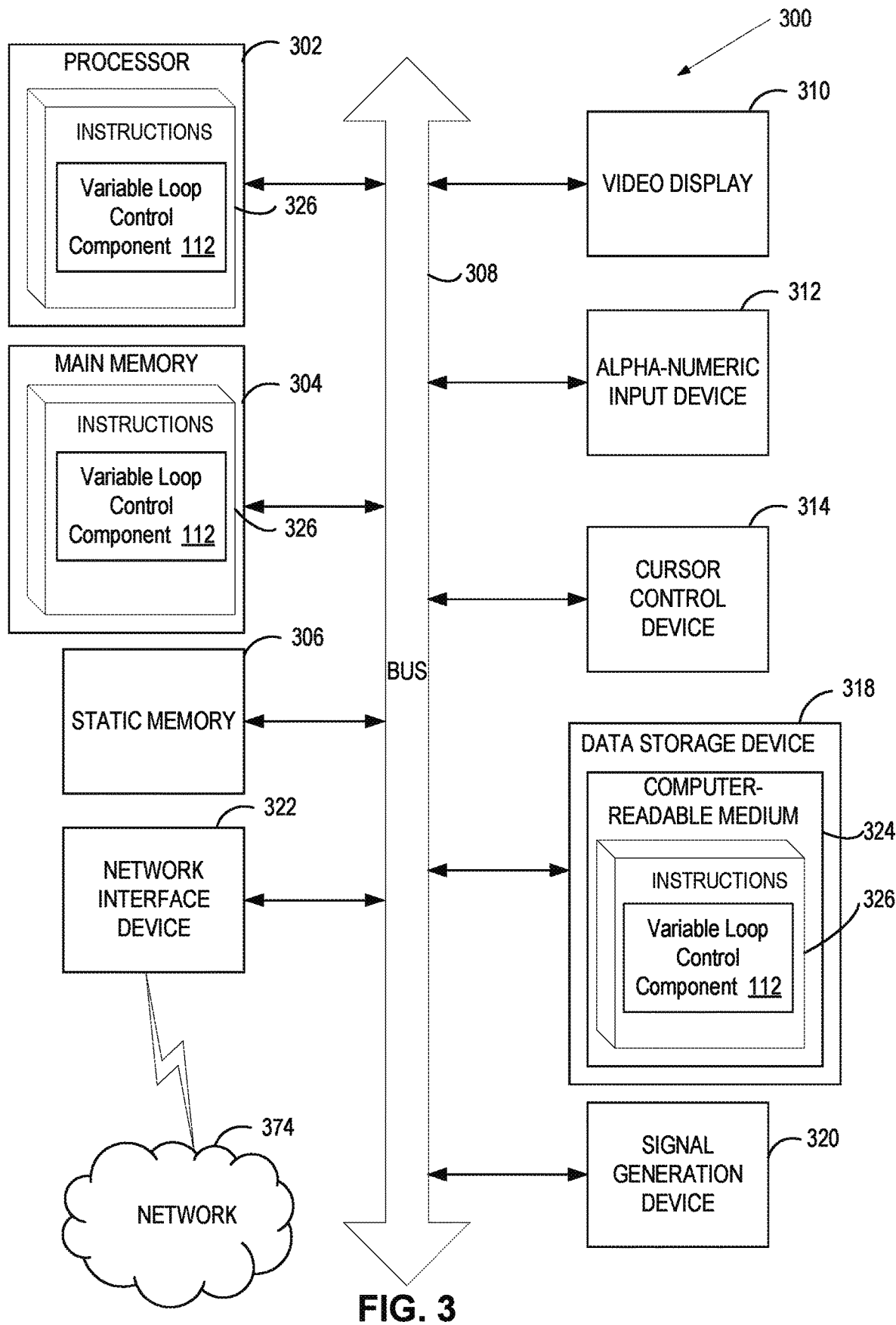
FIG. 3 is a block diagram illustrating a computer system, according to certain embodiments.

FIG. 3 is a block diagram illustrating a computer system 300, according to certain embodiments. In some embodiments, computer system 300 is connected (e.g., via a network, such as a Local Area Network (LAN), an intranet, an extranet, or the Internet) to other computer systems. Computer system 300 operates in the capacity of a server or a client computer in a client-server environment, or as a peer computer in a peer-to-peer or distributed network environment. In some embodiments, computer system 300 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 300 includes a processing device 302, a volatile memory 304 (e.g., Random Access Memory (RAM)), a non-volatile memory 306 (e.g., Read-Only Memory (ROM) or Electrically-Erasable Programmable ROM (EEPROM)), and/or a data storage device 318, which communicates with each other via a bus 308.

In some embodiments, processing device 302 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 300 further includes a network interface device 322 (e.g., coupled to network 374). In some embodiments, computer system 300 also includes a video display unit 310 (e.g., an LCD), an alphanumeric input device 312 (e.g., a keyboard), a cursor control device 314 (e.g., a mouse), and/or a signal generation device 320.

In some implementations, data storage device 318 includes a non-transitory computer-readable storage medium 324 on which stores instructions 326 encoding any one or more of the methods or functions described herein, including instructions encoding components of FIG. 1 (e.g., variable loop control component 112, etc.) and for implementing methods described herein.

In some embodiments, instructions 326 also reside, completely or partially, within volatile memory 304 and/or within processing device 302 during execution thereof by computer system 300, hence, volatile memory 304 and processing device 302 also constitute machine-readable storage media, in some embodiments.

While computer-readable storage medium 324 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICs, FPGAs, DSPs or similar devices. In some embodiments, the methods, components, and features are implemented by firmware modules or functional circuitry within hardware devices. Further, the methods, components, and features are implemented in any combination of hardware devices and computer program components, or in computer programs.

Unless specifically stated otherwise, terms such as "identifying," "determining," "generating," "causing," "depositing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or it includes a general purpose computer system selectively programmed by a computer program stored in the computer system. Such a computer program is stored in a computer-readable tangible storage medium.

The methods and illustrative examples described herein are not inherently related to any particular computer or other apparatus. Various general purpose systems are used in accordance with the teachings described herein, or, in some embodiments, it proves convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
identifying a recipe for depositing a plurality of layers on a substrate in a processing chamber of a substrate processing system, wherein the recipe comprises a plurality of iterations of a set of one or more processes, and wherein each iteration of the plurality of iterations is for depositing at least one layer of the plurality of layers;
determining a plurality of changes to substrate processing parameters for depositing the at least one layer on the substrate to cause layer-to-layer thickness uniformity, wherein each of the plurality of changes corresponds to a respective iteration of the plurality of iterations and is associated with a relative position of a corresponding layer of the plurality of layers; and
causing the plurality of layers to be deposited on one or more substrates based on the recipe and the plurality of changes.

2. The method of claim 1, wherein:
the plurality of changes to substrate processing parameters comprises a plurality of iteration adjustments that are to cause the layer-to-layer thickness uniformity of the plurality of layers;
each iteration adjustment of the plurality of iteration adjustments corresponds to a corresponding iteration of the plurality of iterations; and
one or more of the plurality of iteration adjustments indicate additive operations.

3. The method of claim 2, wherein the layer-to-layer thickness uniformity of the plurality of layers comprises one or more of:
each layer of the plurality of layers has same thickness;
each layer of the plurality of layers is uniform; or
each set of adjacent layers of the plurality of layers has same interplanar spacing.

4. The method of claim 2, wherein the determining of the plurality of changes comprises:
depositing a first plurality of layers of a first type on a first substrate;
determining first metrology data of the first plurality of layers; and
generating, based on the first metrology data, first changes to adjust corresponding substrate processing parameters to cause the layer-to-layer thickness uniformity of the first plurality of layers, wherein the plurality of changes is based on the first changes.

5. The method of claim 1, wherein:
the plurality of changes to substrate processing parameters comprises one or more multipliers that are to cause an adjustment in thickness of one or more layers of the plurality of layers;
each multiplier of the one or more multipliers corresponds to a corresponding iteration of the plurality of iterations; and
the one or more multipliers indicate multiplicative operations.

6. The method of claim 1 further comprising causing, based on the recipe and the plurality of changes, the plurality of layers to be deposited on the one or more substrates.

7. The method of claim 1, wherein:
the set of one or more processes comprises a plurality of substrate processing parameters for depositing the at least one layer on the substrate; and
each of the plurality of changes updates one or more of the plurality of substrate processing parameters of the respective iteration of the set of one or more processes by performing at least one of an additive operation or a multiplicative operation.

8. The method of claim 1, wherein:
each of the plurality of layers is associated with a target layer thickness; and
a first target layer thickness of a first layer of the plurality of layers is different from a second target layer thickness of a second layer of the plurality of layers.

9. The method of claim 1, wherein the determining of the plurality of changes comprises determining one or more sensitivity factors corresponding to one or more substrate processing parameters that correspond to a particular adjustment of thickness.

10. A non-transitory machine-readable storage medium storing instructions which, when executed cause one or more processors to perform operations comprising:
identifying a recipe for depositing a plurality of layers on a substrate in a processing chamber of a substrate processing system, wherein the recipe comprises a plurality of iterations of a set of one or more processes, and wherein each iteration of the plurality of iterations is for depositing at least one layer of the plurality of layers;
determining a plurality of changes to substrate processing parameters for depositing the at least one layer on the substrate to cause layer-to-layer thickness uniformity, wherein each of the plurality of changes corresponds to a respective iteration of the plurality of iterations and is associated with a relative position of a corresponding layer of the plurality of layers; and
causing the plurality of layers to be deposited on one or more substrates based on the recipe and the plurality of changes.

11. The non-transitory machine-readable storage medium of claim 10, wherein:
the plurality of changes to substrate processing parameters comprises a plurality of iteration adjustments that are to cause the layer-to-layer thickness uniformity of the plurality of layers;
each iteration adjustment of the plurality of iteration adjustments corresponds to a corresponding iteration of the plurality of iterations; and
one or more of the plurality of iteration adjustments indicate additive operations.

12. The non-transitory machine-readable storage medium of claim 11, wherein the layer-to-layer thickness uniformity of the plurality of layers comprises one or more of:
each layer of the plurality of layers has same thickness;
each layer of the plurality of layers is uniform; or
each set of adjacent layers of the plurality of layers has same interplanar spacing.

13. The non-transitory machine-readable storage medium of claim 11, wherein the determining of the plurality of changes comprises:
depositing a first plurality of layers of a first type on a first substrate;

determining first metrology data of the first plurality of layers; and generating, based on the first metrology data, first changes to adjust corresponding substrate processing parameters to cause the layer-to-layer thickness uniformity of the first plurality of layers, wherein the plurality of changes is based on the first changes.

14. The non-transitory machine-readable storage medium of claim 10, wherein:

the plurality of changes to substrate processing parameters comprises one or more multipliers that are to cause an adjustment in thickness of one or more layers of the plurality of layers;

each multiplier of the one or more multipliers corresponds to a corresponding iteration of the plurality of iterations; and the one or more multipliers indicate multiplicative operations.

15. The non-transitory machine-readable storage medium of claim 10, wherein the operations further comprise causing, based on the recipe and the plurality of changes, the plurality of layers to be deposited on the one or more substrates.

16. A system comprising:

memory; and one or more processors coupled to the memory, the one or more processors to:

identify a recipe for depositing a plurality of layers on a substrate in a processing chamber of a substrate processing system, wherein the recipe comprises a plurality of iterations of a set of one or more processes, and wherein each iteration of the plurality of iterations is for depositing at least one layer of the plurality of layers;

determine a plurality of changes to substrate processing parameters for depositing the at least one layer on the substrate to cause layer-to-layer thickness uniformity, wherein each of the plurality of changes corresponds to a respective iteration of the plurality of iterations and is associated with a relative position of a corresponding layer of the plurality of layers; and cause the plurality of layers to be deposited on one or more substrates based on the recipe and the plurality of changes.

17. The system of claim 16, wherein:

the plurality of changes to substrate processing parameters comprises a plurality of iteration adjustments that are to cause the layer-to-layer thickness uniformity of the plurality of layers;

each iteration adjustment of the plurality of iteration adjustments corresponds to a corresponding iteration of the plurality of iterations; and one or more of the plurality of iteration adjustments indicate additive operations.

18. The system of claim 17, wherein the layer-to-layer thickness uniformity of the plurality of layers comprises one or more of:

each layer of the plurality of layers has same thickness;

each layer of the plurality of layers is uniform; or each set of adjacent layers of the plurality of layers has same interplanar spacing.

19. The system of claim 17, wherein to determine the plurality of changes, the one or more processors are to:

depositing a first plurality of layers of a first type on a first substrate;

determining first metrology data of the first plurality of layers; and generating, based on the first metrology data, first changes to adjust corresponding substrate processing parameters to cause the layer-to-layer thickness uniformity of the first plurality of layers, wherein the plurality of changes is based on the first changes.

20. The system of claim 16, wherein:

the plurality of changes to substrate processing parameters comprises one or more multipliers that are to cause an adjustment in thickness of one or more layers of the plurality of layers;

each multiplier of the one or more multipliers corresponds to a corresponding iteration of the plurality of iterations; and the one or more multipliers indicate multiplicative operations.

* * * * *